Oct. 3, 1967  W. W. MIECZKOWSKI, JR  3,344,601
INTERCONNECTION FOR FLAMETUBES
Filed Jan. 18, 1966
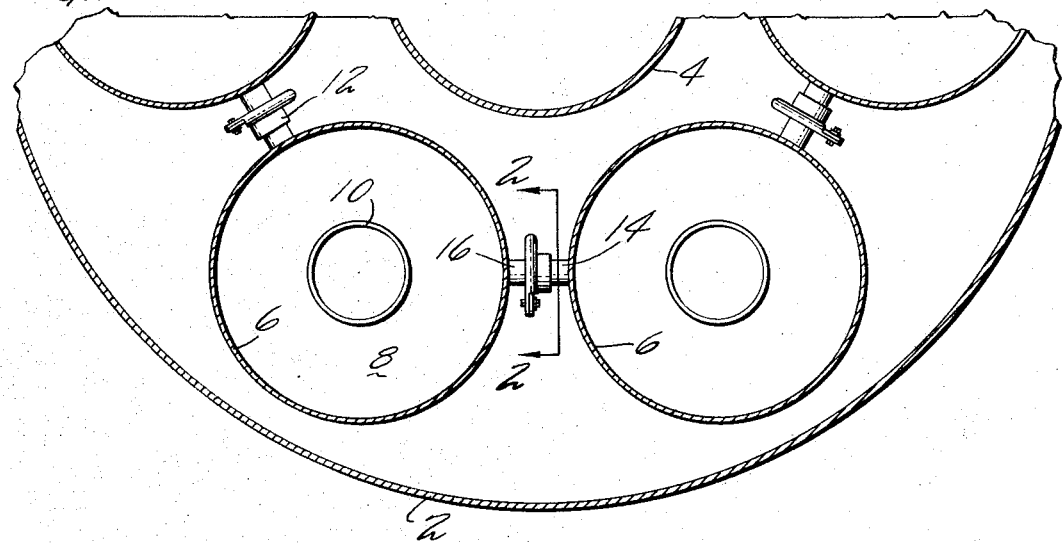
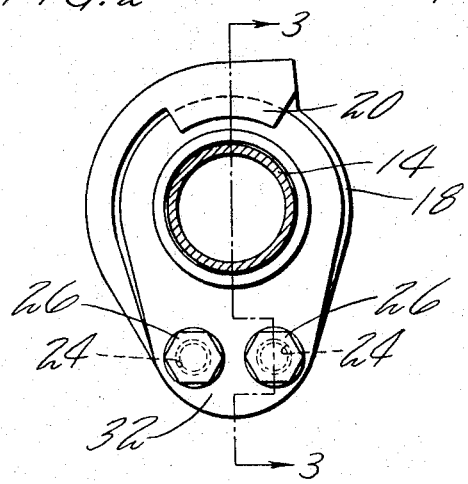
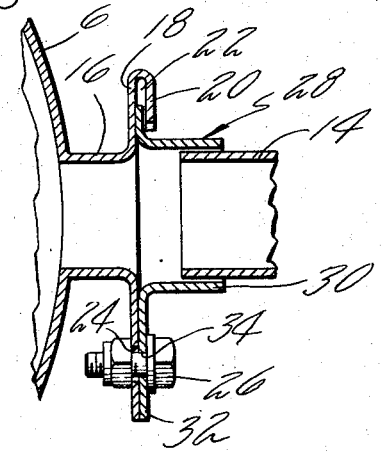
INVENTOR
WILLIAM W. MIECZKOWSKI, JR.
BY Charles Q. Warren
ATTORNEY 3,344,601
INTERCONNECTION FOR FLAMETUBES
William W. Mieczkowski, Jr., Glastonbury, Conn., assignor to United Aircraft Corporation, East Hartford, Conn., a corporation of Delaware
Filed Jan. 18, 1966, Ser. No. 521,342
3 Claims. (Cl. 60—39.32)

ABSTRACT OF THE DISCLOSURE

A combustion chamber construction wherein a crossover interconnection between adjacent flametubes is provided in which sliding action between the members of the interconnection is avoided and compensation is made for any misalignment between the adjacent flametubes.

This invention relates to a crossover tube arrangement for use in interconnecting flametubes in a combustion section of a gas turbine engine.

Because of tolerance variations these flametubes, which are generally substantially circular in cross section and which extend in substantially parallel relation within the combustion section, are not always in such precise spacing and position that crossover tube extensions on adjacent flametubes will be in axial or radial alignment. Even a small variation in this alignment makes difficult a suitable interconnection between the tube extensions. One feature is a simple attachment by which to compensate for the small misalignment that frequently occurs.

Further, these crossover tube extensions must move toward each other as a result of thermal expansion when the engine is in operation. Sliding movement has been utilized but, after hours of operation the material wears thus allowing leakage and/or ceases to have a surface permitting free sliding movement. The air leakage around the crossover tube may affect the flow pattern within the flametube resulting in a nonuniform turbine inlet temperature pattern. A feature of this invention is an interconnection for the crossover tubes that will avoid any sliding action between the parts during the operation of the engine.

Other features and advantages will be apparent from the specification and claims, and from the accompanying drawing which illustrates an embodiment of the invention.

FIG. 1 is a transverse sectional view through a semi-annular combustion chamber.

FIG. 2 is a view substantially along the line 2—2 of FIG. 1.

FIG. 3 is a sectional view along the line 3—3 of FIG. 2.

The invention is shown in connection with a semi-annular combustion chamber for use in a gas turbine powerplant which may be, for example, the type shown in the Savin Patent 2,747,367. Air from the compressor passes through an annular combustion chamber defined by an outer wall 2 and a concentric inner wall 4. Within this annular duct are located a plurality of substantially cylindrical flametubes 6 having at their upstream ends an end cap 8 with one or more openings 10 therein to receive the fuel nozzles for the injection of combustible fluid into the flametube.

Adjacent flametubes 6 are interconnected by crossover connectors or tube extensions 12 extending between adjacent flametubes. Each crossover connector consists of a crossover tube 14 projecting from one of the flametubes and an aligned crossover tube 16 extending outwardly from the adjacent flametube, the crossover tube 16 being substantially in alignment, as shown, and being preferably substantially equal in diameter. As shown, the outer or free end of the crossover tube 14 is not modified in any way.

The outer or free end of the other crossover tube 16 has an integral flange 18 thereon arranged at right angles to the axis of the tube 16 and having at one point in its periphery a folded over or rebent flap 20 extending in parallel relation to the adjacent portion of the flange 18 and providing a groove 22 therebetween. Diametrically opposite to the groove 22 and formed in the flange 18 are spaced bolt holes 24 receiving bolts 26 therein. The openings 24 are larger in diameter than the shank in the bolt 26, as shown, for the purpose of permitting a freedom of movement therebetween.

The bolts 26 support a connector ring 28 which consists of a tube or cylindrical extension 30 slightly larger in diameter than the crossover tube 14 and surrounding the free end thereof. Integral with the tube 30 is a flange 32 located at one end thereof and in a position to engage with the flange 18, as shown. A portion of the flange 32 projects into the groove 22 so that the connector is held in position at this point. Another portion of the flange 32 has bolt receiving holes 34 for the bolts 26 such that the connector 28 is securely held in position on the flange 18 and is mounted to provide, as shown, a slight clearance between the tube 30 and the crossover tube 14.

In the event of any misalignment between the crossover tubes 14 and 16 by reason of the adjacent flametubes being misaligned in any way, the freedom of movement of the connector 28 in a direction radially of the tubes 14 and 30 will permit the connector 28 to be accommodated to the misalignment. After the connector 28 is properly located with the radial clearance shown in FIG. 3, the bolts 26 are tightened in position and the connector will then be held in a rigid position to serve both to connect the tubes 14 and 16 but also to maintain the established alignment during engine operation. By providing the radial clearance between the tubes 14 and 30 it is obvious that there is freedom for relative axial movement without sliding contact and also there is a measurable amount of relative radial movement permissible without causing any sliding contact.

It is to be understood that the invention is not limited to the specific embodiment herein illustrated and described, but may be used in other ways without departure from its spirit as defined by the following claims.

The embodiments of the invention in which an exclusive property or privilege is claimed are defined as follows:

1. In a burner construction, the combination with closely adjacent substantially parallel flametubes, of a laterally projecting tube extension on one of the flametubes projecting toward the other flametube and having a flange on the end remote from one flametube, a cooperating tube extension on the adjacent flametube extending toward said one flametube and in substantially axial alignment with the laterally projecting tube extension, the adjacent ends of the tube extension being axially spaced apart, and a connector having a tube portion in mutually overlapping relation to the outer end of the cooperating tube extension, said connector also having a flanged end substantially coextensive with the flange on the first tube extension, and means for securing said flange and said flanged end together, the means including at least two bolts extending through said flange and said flanged end with clearance around the bolts to permit the tube portion of the connector to be positioned concentric to the cooperating tube extension.

2. A crossover tube construction as in claim 1 in which the flange has a short peripheral rebent flange thereon to receive the edge of the flanged connector.

3. A burner construction as in claim 1 in which the tube portion and the cooperating tube extension are of different dimensions perpendicular to the axis of engagement of the tubes to provide radial clearance therebetween when assembled.

References Cited

UNITED STATES PATENTS

| | | | |
|---|---|---|---|
| 2,525,207 | 10/1950 | Clarke et al. | 60—39.82 |
| 2,628,851 | 2/1953 | Jessup | 285—178 |
| 3,244,424 | 4/1966 | Cope | 285—178 X |

FOREIGN PATENTS

| | | |
|---|---|---|
| 539,819 | 12/1931 | Germany. |
| 686,382 | 1/1953 | Great Britain. |

CARLTON R. CROYLE, *Primary Examiner.*